Patented Feb. 24, 1931

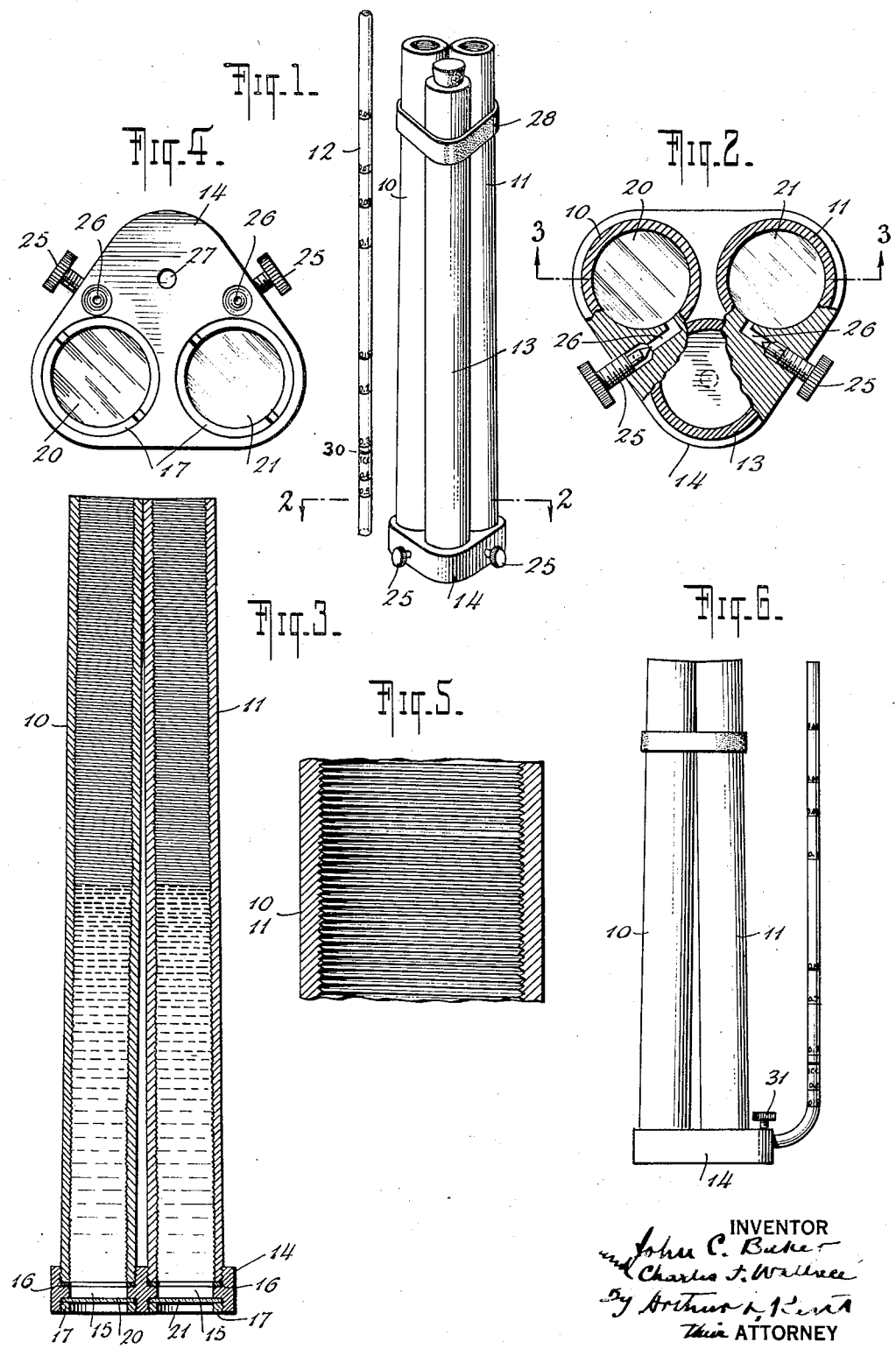

1,794,134

UNITED STATES PATENT OFFICE

JOHN C. BAKER, OF MONTCLAIR, AND CHARLES F. WALLACE, OF WESTFIELD, NEW JERSEY, ASSIGNORS TO WALLACE & TIERNAN PRODUCTS, INC., OF BELLEVILLE, NEW JERSEY, A CORPORATION OF NEW JERSEY

COLORIMETER

Application filed June 8, 1926. Serial No. 114,558.

This invention relates to an improved colorimeter, or color comparator, for use in making volumetric analyses by determining the strength of color of a liquid by comparison with a standard. The invention has been made especially with the idea of providing an improved instrument for use in making the so-called ortho-tolidin tests for determining the amount of free chlorine in water. The invention is, of course, not limited to such use, but is applicable for use generally in colorimetric work.

The invention aims to provide an instrument or device which is compact, easily portable, convenient to use and accurate in results; which avoids the necessity of using color solutions as color standards, substituting therefor a color standard which is permanent and constant; which eliminates the errors met with in the use of previous apparatus resulting from refraction of light through the sides of the liquid containing tubes and reflection from the inside of the tubes and from nephelometric effects, and which, in the testing of liquids by comparison of color resulting from the action of a reagent, provides for compensation for the natural color of the liquid being tested.

To these ends, apparatus according to the invention comprises two tubular containers, or comparator tubes, one having a suitably colored transparent bottom to serve as the color standard, and the other having a colorless transparent bottom and serving to hold the liquid which is to be tested by looking down through the tubes held above a white surface to compare the color of the liquid in the one tube with the color standard of the other tube. The two tubes have opaque side walls the interior surfaces of which are unpolished light-absorbing surfaces and are rough, or broken, to prevent light entering through the bottom of the tubes from being reflected from the side walls to the eye of the user. Most desirably, the tubes are mounted side by side, together with a stoppered tubular container for holding a testing solution or reagent, on a suitable base, and each of the comparator tubes is provided with a drain cock for drawing off liquid to adjust the depth of liquid in the tube. A transparent measuring tube is provided for measuring the depth of liquid in the testing tube which may be marked with a calibrated scale for desired direct readings. The measuring tube is most desirably a separate tube not attached to the main assembly and adapted to be used as a pipette for putting a desired amount of reagent solution in the liquid being tested.

The accompanying drawings illustrate an approved apparatus of the form we now consider best and which is being made especially for determining the free chlorine content of water by the ortho-tolidin test, and also a slightly modified form of apparatus. In said drawings:—

Fig. 1 is a perspective view of the apparatus;

Fig. 2 is a horizontal sectional view taken on line 2—2 of Fig. 1 but on an enlarged scale and partly broken away to show portions of the base in section;

Fig. 3 is a vertical sectional view taken on line 3—3 of Fig. 2 but on a somewhat reduced scale;

Fig. 4 is a bottom plan view;

Fig. 5 is an enlarged sectional detail view showing a portion of the interior surface of one of the comparator tubes; and Fig. 6 is a view in elevation of an instrument similar to that shown by Figs. 1 to 5 but having an attached transparent measuring tube.

Referring to the drawings, and first to Figs. 1 to 5, the apparatus shown comprises two comparator tubes 10 and 11, a pipette gauge tube 12, a stoppered tubular container 13 for holding a supply of ortho-tolidin solution or other reagent, and a base 14 on which the tubes 10 and 11 and the container 13 are mounted.

The tubes 10 and 11 are removably attached to the base by having their bottom ends threaded and screwed into threaded openings extending through the base. Each of the openings in the base has a flange 15 providing a shoulder supporting a gasket 16 against which the end of the tube seats to make a tight joint. Seated and sealed against the under side of the flange 15 of each of said openings and held in place by a screw ring 17 is a plate of glass or other suitable transparent material which forms the bottom of the tube. The plate 20 which forms the bottom of the tube 10 is of a suitable color to serve as the color standard. The tube 11 is the testing tube for containing the liquid being tested, and the plate 21 which forms the transparent bottom of this tube is colorless. The particular color of the plate 20 forming the bottom of the color standard tube 10 will depend on the use to which the apparatus is to be put, and plates of different colors may be substituted to adapt the instrument for different tests. For ortho-tolidin testing of water for its free chlorine content the plate will be of a yellow color corresponding to the color of a body of water containing some free chlorine and to which ortho-tolidin solution has been added. The strength of the color of the plate, when using the apparatus as herein described, will depend on the range in which it is desired to work. The color may, for example, be of a strength corresponding to that seen when looking through about ten inches of water containing a minimum amount of chlorine, say about .05 parts of chlorine to a million parts of water and to which ortho-tolidin solution has been added in the proportion of 1 c. c. of solution to 100 c. c. of water.

In order that the user looking downward through the tubes may with one eye see the full bottom sight openings of both tubes, the tubes are most desirably set with their upper ends close together and their lower ends spaced slightly apart as shown.

A valve or drain cock 25 is provided at the bottom of each tube, formed in the apparatus shown by a needle valve which controls a passage 26 formed in the base 14 leading from the face of the flange 15 to a discharge opening in the bottom of the base.

The container 13 is also removably mounted on the base 14 to extend alongside the tubes 10 and 11, the bottom of the container or a projection therefrom extending into an opening 27 in the base. This opening may conveniently be a plain unthreaded opening, and the comparator tubes and the container tube may conveniently be held together by means of a band of rubber or other suitable band 28, slipped over the upper ends of the tubes. The tubes may thus be readily removed from the base and all parts of the apparatus are easily accessible.

The gauge tube 12 consists of a small transparent tube most desirably of transparent celluloid and of a length somewhat greater than the length of the comparator tubes, and when not in use may be slid endwise beneath and be held by the band 28 between two of the tubes. For clearness of illustration it has been shown removed from the rest of the apparatus. It is used as a pipette for transferring a desired amount of reagent solution from the container 13 to the testing tube 11, and also as a gauge for measuring the depth of liquid in the testing tube. It is marked, as at 30, to show the amount, as 1 c. c. of solution to be transferred from the container to the testing tube, and is also marked with graduations calibrated to indicate parts of free chlorine per million parts of water, when the instrument is to be used for determining the chlorine content of water. It may, of course, be marked with calibrated graduations for direct readings or for other tests involving the determination of color strength of a liquid.

By making the walls of the comparator tubes opaque, error in reading the color when looking downward through the tubes due to the entrance of light through the sides of the tubes is avoided, but reflection from the interior wall of light entering from the bottom of the tube was still found to constitute a source of error. A halo or halos would appear to surround the sight opening, even if the interior walls were unpolished so as to provide a surface which would be a light-absorbing surface if dry, and was not overcome even by slightly roughening the interior surface. I have found that this source of error due to light reflection from the interior surface of the tubes may be eliminated by suitably roughening or breaking up the surface by such irregularities or elevations and depressions in the surface that it becomes a succession of small surfaces or faces standing at such angles to the axis of the tube that all of the reflected light will strike such small surfaces or faces at an angle which will enable it to pass from the body of liquid or through the film of liquid on the surface above the liquid level and be absorbed by the light-absorbing surface of the tube wall before any of it can reach the upper or eye end of the tube. Such a surface which gives good results may be formed by applying to the inner surface of the tube sand coated with a suitable black pigment, but the desired result is best accomplished by cutting a fine thread in the inner surface of the tube for its entire length, thus providing the surface with a succession of circumferentially extending closely spaced V-shaped grooves, and for best results and most complete elimination of reflection the threads should be cut full depth so that the successive grooves will meet to form sharp angles. The size and shape of the threads thus cut in the interior surface of the tubes may vary, but I have found that an ordinary V thread of about 30 threads to the inch is entirely satisfactory. Fig. 5 shows the interior of a portion of one of the tubes cut with such a thread but enlarged to about double size.

A further advantage results from the threading of the interior surface of the comparator tubes, or otherwise providing them with a suitable rough or broken surface, and this is that this roughening of the surface has the effect of flattening the meniscus at the surface of the liquid standing in the tube. The accuracy of the color reading and comparing is thereby increased because the field of vision or view of the sight opening at the bottom of the tube is kept more nearly constant for readings with the liquid standing at different levels in the tube.

The apparatus may be used for determining the chlorine content of water by the ortho-tolidin test, for example, as follows:— The two comparator tubes being empty and clean, both are filled to within about one-half an inch of the top, or to other predetermined point, with the water to be tested. One c. c. of ortho-tolidin solution is then transferred from the container 13 to the testing tube 11 which has the colorless transparent bottom. The reagent is then mixed with the water in the testing tube, as by covering the tubes and reversing them, and after about five minutes' rest the color comparison may be made. The strength of the color of the treated water in the testing tube will indicate the amount of free chlorine in the water, and this strength of color is determined by looking downward through both tubes to compare the color of the water in the testing tube with the color standard seen through the other tube, and drawing off the water from both tubes until the color in the testing tube matches the color seen in the standard tube with the liquid standing at approximately the same level in both tubes. The most convenient way of operating to get this result is to first lower the level of the liquid in the testing tube until it approximately matches the color in the standard tube, then draw down the level of the solution in the standard tube until it is approximately equal to that in the testing tube, and finally adjust the liquid levels until the colors in the tubes match and the liquid stands at approximately the same level in the two tubes. The depth of liquid in the testing tube is then measured by inserting the measuring tube 12 until it touches the bottom of the testing tube and then closing the top of the measuring tube and lifting it up and reading off on the scale at the level of liquid in the tube the amount of free chlorine in parts per million of the water tested. The water in the standard tube, standing at the same level as the water in the testing tube, compensates for the natural color of the water being tested, affecting the color of the standard color plate as seen through the standard tube to the same degree as this color produced in the water in the testing tube is affected by the natural color of the water.

The instrument shown in Fig. 6 differs from that shown by Figs. 1 to 5 only in having a measuring tube for showing the level of liquid in the testing tube and calibrated to give direct readings attached to the main assembly, the lower end of the measuring tube being connected to the lower end of the testing tube by a passage through the base controlled by a valve 31. The valve 31 is kept closed until the color comparison has been made and is then opened to permit the liquid to enter the measuring tube.

What is claimed is:

1. A colorimeter, comprising two liquid-holding color comparator tubes having opaque side walls, one having a colorless transparent bottom, the other having a colored transparent bottom, to serve as a color standard, and the interior surface of each tube being broken by irregularities to prevent light entering through the bottom of the tube being reflected from the side wall to the eye of the user and to flatten the meniscus at the surface of liquid in the tube.

2. A colorimeter, comprising two liquid-holding color comparator tubes having opaque side walls, one having a colorless transparent bottom, the other having a colored transparent bottom to serve as a color standard, and the interior surface of each tube being a black, light-absorbing surface and being broken by irregularities to prevent light entering through the bottom of the tube being reflected from the side wall to the eye of the user and to flatten the meniscus at the surface of liquid in the tube.

3. A colorimeter, comprising two liquid-holding color comparator tubes having opaque side walls, one having a colorless transparent bottom, the other having a colored transparent bottom to serve as a color standard, the interior surface of each tube being broken throughout its length by closely spaced circumferentially extending grooves.

4. A colorimeter, comprising two liquid-holding color comparator tubes having opaque side walls, one having a colorless transparent bottom, the other having a colored transparent bottom to serve as a color standard, and each tube being interiorly screw threaded.

5. A colorimeter, comprising two liquid-holding color comparator tubes having opaque side walls, one having a colorless transparent bottom, the other having a colored transparent bottom to serve as a color standard, and each tube being interiorly screw threaded and the interior surface being a black light-absorbing surface.

6. A colorimeter, comprising two liquid-holding color comparator tubes having opaque side walls, one having a colorless transparent bottom, the other having a colored transparent bottom to serve as a color standard, and the interior surface of each tube being a black, light-absorbing surface and being broken by irregularities to prevent light entering through the bottom of the tube being reflected from the side wall to the eye of the user and to flatten the meniscus at the surface of the liquid in the tube, and a drain cock at the bottom of each tube for adjusting the liquid level in the tube.

7. A colorimeter, comprising two liquid-holding color comparator tubes having opaque side walls, one having a colorless transparent bottom, the other having a colored transparent bottom to serve as a color standard, and the interior surface of each tube being a black, light absorbing surface and being broken by irregularities to prevent light entering through the bottom of the tube being reflected from the side wall to the eye of the user and to flatten the meniscus at the surface of the liquid in the tube, a drain cock at the bottom of each tube for adjusting the liquid level in the tube, and means for measuring the depth of liquid in the comparator tubes.

8. A colorimeter, comprising two liquid-holding color comparator tubes and a container tube for holding re-agent detachably mounted on a support, one of the comparator tubes having a colorless transparent bottom and the other having a colored transparent bottom to serve as a color standard, and a pipette tube for transferring re-agent from the container tube to the comparator tube having the colorless transparent bottom and marked to serve as a measuring tube for measuring the depth of liquid in the comparator tube having the colorless transparent bottom.

9. A liquid-holding color comparator tube having opaque side walls and a transparent bottom, and having its interior surface a black light-absorbing surface broken by irregularities to prevent light entering through the bottom of the tube being reflected from the side wall to the eye of the user and to flatten the meniscus at the surface of the liquid in the tube.

10. A liquid-holding color comparator tube having opaque side walls and a transparent bottom, and having its interior surface roughened to flatten the meniscus at the surface of liquid in the tube.

11. A liquid-holding color comparator tube having opaque side walls and a transparent bottom and having its interior surface threaded to prevent light entering through the bottom of the tube being reflected from its side wall to the eye of the user and to flatten the meniscus at the surface of the liquid in the tube.

In testimony whereof, we have hereunto set our hands.

JOHN C. BAKER.
CHARLES F. WALLACE.